(12) United States Patent
Zarenin

(10) Patent No.: US 7,512,774 B2
(45) Date of Patent: Mar. 31, 2009

(54) METHOD AND SYSTEM FOR COLLECTING PROCESSOR INFORMATION

(75) Inventor: Alex Zarenin, Montclair, NJ (US)

(73) Assignee: Barclays Capital Inc., New York, NY (US)

( * ) Notice: Subject to any disclaimer, the term of this patent is extended or adjusted under 35 U.S.C. 154(b) by 505 days.

(21) Appl. No.: 10/924,644

(22) Filed: Aug. 24, 2004

(65) Prior Publication Data

US 2005/0235002 A1   Oct. 20, 2005

Related U.S. Application Data

(60) Provisional application No. 60/576,003, filed on Jun. 1, 2004.

(51) Int. Cl.
*G06F 3/00* (2006.01)
*G06F 9/00* (2006.01)

(52) U.S. Cl. ................................ 713/1; 719/316

(58) Field of Classification Search ............ 713/1; 719/316

See application file for complete search history.

(56) References Cited

U.S. PATENT DOCUMENTS

| | | | |
|---|---|---|---|
| 6,721,941 B1 | 4/2004 | Morshed et al. | |
| 6,831,670 B2 | 12/2004 | Fujiwara | |
| 7,024,476 B1 | 4/2006 | Page et al. | |
| 2003/0105732 A1* | 6/2003 | Kagalwala et al. ............. | 707/1 |
| 2003/0174156 A1 | 9/2003 | Katsuhara et al. | |
| 2003/0229740 A1* | 12/2003 | Maly et al. .................. | 710/107 |
| 2004/0010781 A1* | 1/2004 | Maly et al. .................. | 717/143 |
| 2004/0088708 A1* | 5/2004 | Ramanujam et al. ........ | 718/107 |
| 2004/0107369 A1* | 6/2004 | Cooper et al. ............... | 713/300 |
| 2004/0107374 A1* | 6/2004 | Cooper et al. ............... | 713/320 |
| 2004/0107421 A1* | 6/2004 | VoBa et al. .................. | 718/102 |
| 2004/0128563 A1* | 7/2004 | Kaushik et al. ............. | 713/300 |
| 2004/0226026 A1* | 11/2004 | Glass et al. .................. | 719/328 |

FOREIGN PATENT DOCUMENTS

| | | |
|---|---|---|
| JP | 07-219606 | 8/1995 |
| WO | WO 00/38048 | 6/2000 |

OTHER PUBLICATIONS

"Windows Management Instrumentation Provider Programming", (White Paper), Microsoft Corporation, 1999, pp. 1-26.*
Cole, Gwyn and Tunstall, Craig. Developing WMI Solutions: A Guide to Windows Management Instrumentation. Pearson Education, Inc., published Nov. 12, 2002. Chapters 10-12.*
"CIM System Model White Paper" Jun. 17, 2003, pp. 1-22.
Stemp, Greg, Microsoft Corporation, "WMI Helps Those Who Help Themselves," Feb. 11, 2004, retrieved on Jul. 24, 2007 from Internet: <url:http://msdn2.microsoft.com/en-us/library/ms974554(d=printer).aspx>.

* cited by examiner

*Primary Examiner*—Chun Cao
(74) *Attorney, Agent, or Firm*—Morgan, Lewis & Bockius LLP

(57) ABSTRACT

Information regarding processors present on computer systems is collected. A hyper-threading processor class definition is established. A hyper-threading property provider is created. The hyper-threading property provider is loaded on one or more processors present on a computer system. The hyper-threading property provider gathers a hyper-threading status of one or more of the processors and a number of logical and physical processors on the computer system.

9 Claims, 10 Drawing Sheets

```
//*******************************************
// WBEM Property Provider Interface Definition
// Imported from WbemProv.idl
//*******************************************
    [
    object,
    uuid(CE61E841-65BC-11d0-B6BD-00AA003240C7)
    ]
interface IWbemPropertyProvider : IUnknown
    {
    HRESULT GetProperty(
        [in] long lFlags,
        [in] const BSTR strLocale,
        [in] const BSTR strClassMapping,
        [in] const BSTR strInstMapping,
        [in] const BSTR strPropMapping,
        [out] VARIANT* pvValue
        );

HRESULT PutProperty(
        [in] long lFlags,
        [in] const BSTR strLocale,
        [in] const BSTR strClassMapping,
        [in] const BSTR strInstMapping,
        [in] const BSTR strPropMapping,
        [in] const VARIANT* pvValue
        );
    };
```

FIG. 3

```
//*******************************************
// WBEM Property Provider Initialization
// Interface Definition.
// Imported from WbemProv.idl
//*******************************************
    [
    object,
    uuid(1be41572-91dd-11d1-aeb2-00c04fb68820)
    ]
interface IWbemProviderInit : IUnknown
    {
    HRESULT Initialize(
        [in, unique, string] LPWSTR wszUser,
        [in] LONG lFlags,
        [in, string] LPWSTR wszNamespace,
        [in, unique, string] LPWSTR wszLocale,
        [in] IWbemServices* pNamespace,
        [in] IWbemContext* pCtx,
        [in] IWbemProviderInitSink* pInitSink
        );
    };
```

FIG. 4

```
//*********************************************
// Base Class Interface Definition
//*********************************************
    [
    object,
    uuid(58132431-8E41-4E95-94E3-E51ECF0BB911),
    dual,
    helpstring("IWPPHT Interface"),
    pointer_default(unique)
    ]
interface IWPPHT : IDispatch
    {
    };
```

FIG. 5

```
//*********************************************
// WPPMI Class Definition
//*********************************************
    [
    uuid(E6E084BE-38BB-4E55-9AA0-1783C7211FAC),
    helpstring("WPPHT Class")
    ]
coclass WPPHT
    {
                interface IWPPHT;
    [default]   interface IWbemPropertyProvider;
                interface IWbemProviderInit;
    };
```

FIG. 6

```
unsigned int HTSupported(void)
    {
    unsigned int Regedx      = 0;
    unsigned int Regeax      = 0;
    unsigned int VendorId[3] = {0, 0, 0};

__try    // Verify cpuid instruction is supported
       {
       __asm
          {
          xor eax, eax        // call cpuid with eax = 0
          cpuid               // Get vendor id string
          mov VendorId, ebx
          mov VendorId + 4, edx
          mov VendorId + 8, ecx mov eax, 1          // call cpuid with eax = 1
          cpuid
          mov Regeax, eax     // eax contains family processor type
          mov Regedx, edx     // edx has info about the availability of H-Threading
          }
       }
    __except (EXCEPTION_EXECUTE_HANDLER)
       {
       return(0);             // cpuid is unavailable
       }

// FAMILY_ID       0x00000F00 - EAX[11:8]  Bit 8-11  contains family processor ID.
    // EXT_FAMILY_ID   0x00F00000 - EAX[23:20] Bit 20-23 contains ext. fam. processor ID
    if (   (Regeax & FAMILY_ID) ==  PENTIUM4_ID
         ||
            (Regeax & EXT_FAMILY_ID)
        )
        if (  VendorId[0] == 'uneG'
              &&
              VendorId[1] == 'Ieni'
              &&
              VendorId[2] == 'letn'
           )
              return(Regedx & HT_BIT);   // Genuine Intel with H-Threading technology return 0;    // Not genuine Intel processor
    }
```

FIG. 7

```
unsigned char LogicalProcPerPhysicalProc(void)
    {
    unsigned int RegEBX = 0;

if ( !HTSupported() )
        return (unsigned char) 1;   // HT not supported
                                    // Logical processor = 1
    __asm
        {
        mov eax, 1
        cpuid
        mov RegEBX, ebx
        }

// EBX[23:16] Bit 16-23 in ebx contains the number of logical
    // processors per physical processor when execute cpuid with
    // eax set to 1
    //-----------------------------------------------------------
    // NUM_LOGICAL_BITS         0x00FF0000
    //-----------------------------------------------------------
    return (unsigned char) ((RegEBX & NUM_LOGICAL_BITS) >> 16);
    }
```

FIG. 8

```
//================================================================
//== Namespace: \\\\.\\root\\CIMV2                              ==
//================================================================
#pragma namespace ("\\\\.\\root\\CIMV2")

//----------------------------------------------------------------
//-- Instance: __Win32Provider                                  --
//----------------------------------------------------------------
instance of __Win32Provider as $WPPHT
{
    Enabled = TRUE;
    Name = "HTCPUInfo";
    ClsId = "{A677D067-9C48-4EF2-8DB3-BF2B43B434E9}";
};

//----------------------------------------------------------------
//-- Instance: __PropertyProviderRegistration                   --
//----------------------------------------------------------------
instance of __PropertyProviderRegistration
{
    Provider = $WPPHT;
    SupportsPut = FALSE;
    SupportsGet = TRUE;
};

//----------------------------------------------------------------
//-- Class: HTProcessor                                         --
//----------------------------------------------------------------
#pragma deleteclass("HTProcessor", NOFAIL)
class HTProcessor
{
    [KEY]
    uint32    Index;
    STRING    Status;
    uint32    LogicalCpuCount;
    uint32    PhysicalCpuCount;
};

//----------------------------------------------------------------
//-- Instance: HTCPUInfo Provider --
//----------------------------------------------------------------
[DYNPROPS,ClassContext("HTProcessor"),InstanceContext("1")]
instance of HTProcessor
{
    Index = 1;
    [PropertyContext("Status"), DYNAMIC, Provider("HTCPUInfo")] Status;
    [PropertyContext("LCPUCnt"), DYNAMIC, Provider("HTCPUInfo")] LogicalCpuCount;
    [PropertyContext("PCPUCnt"), DYNAMIC, Provider("HTCPUInfo")] PhysicalCpuCount;
};
```

FIG. 9

METHOD AND SYSTEM FOR COLLECTING PROCESSOR INFORMATION

The present application claims priority to U.S. Provisional Patent Application No. 60/576,003, filed Jun. 1, 2004, entitled "Method for Collecting Processor Information."

BACKGROUND OF THE INVENTION

FIELD OF THE INVENTION

The present invention relates to managing enterprise systems, applications, and networks.

BACKGROUND OF THE INVENTION

One of the greatest challenges facing information technology managers is managing enterprise systems, applications, and networks as they become larger and more complex. In order to help solve these problems and reduce the total cost of ownership (TCO) of Windows-based servers and desktops, Microsoft has developed Windows Management Instrumentation (WMI), a scalable management infrastructure, and included it as part of the Windows Operating System.

WMI is the Microsoft implementation of Web-Based Enterprise Management (WBEM)—an industry initiative to develop a standard technology for accessing management information in an enterprise environment. The WBEM initiative results from the cooperative efforts of Microsoft, BMC Software, Cisco Systems, Compaq Computer, and Intel, as well as many other member companies active in the Distributed Management Task Force (DMTF). To represent systems, applications, networks, devices, and other managed components adopted by the DMTF, WMI uses the Common Information Model (CIM) defined by DMTF. WMI includes the managed objects defined by CIM as well as extensions to the CIM model for additional information available from the Windows platform.

The WMI architecture consists of the management infrastructure and WMI providers. A management infrastructure includes the CIM Object Manager (CIMOM) and a central storage area for management data called the CIMOM Object Repository. The CIMOM provides applications with uniform access to management data. WMI providers function as intermediaries between CIMOM and managed objects. CIMOM hides the capabilities of specific providers from WMI-based management applications, presenting a uniform set of capabilities (data retrieval and update, query, method execution, and events) through a single API irrespective of the capabilities of the underlying provider.

This layered architecture provides for seamless expansion of the WMI framework by allowing more providers to be added into this architecture as needed. The need for new providers arises when new managed resources are introduced into the computing environment or existing resources go through significant changes. Lately, computer processors have become one of those significantly changed resources.

Processors have been, and remain, the core of computer systems. With the advances in processor designs, multi-processor systems have become available. WMI was keeping up with those changes—through the built-in providers and predefined classes, such as Win32_Processor and Win32_ComputerSystemProcessor, by way of example. WMI was capable of providing consistent and meaningful management information about physical processors present in the computer system. However, the situation has changed with the introduction by Intel the new line of Pentium IV processors with the hyper-threading technology.

A single physical hyper-threading-capable processor is capable of managing two threads of program execution simultaneously and thus appears to the host operating system as two "virtual" CPUs, which, from the OS perspective, are indistinguishable from two physical CPUs. Thus, on the hyper-threading-enabled systems, the OS and, subsequently, WMI will report double the number of physical CPUs present on the system. Obviously, from the asset management perspective, this is unacceptable.

SUMMARY OF THE INVENTION

The present invention is directed to a method and system for collecting information regarding processors present on computer systems. A hyper-threading processor class definition is established. A hyper-threading property provider is created. The hyper-threading property provider is loaded on one or more processors present on a computer system. The hyper-threading property provider gathers a hyper-threading status of one or more of the processors and a number of logical and physical processors on the computer system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

In the drawings:

FIG. 3 illustrates an interface definition used in connection with a preferred embodiment of the present invention;

FIG. 4 illustrates an interface definition used in connection with a preferred embodiment of the present invention;

FIG. 5 illustrates an interface definition used in connection with a preferred embodiment of the present invention;

FIG. 6 illustrates a class definition used in connection with a preferred embodiment of the present invention;

FIG. 7 illustrates sample code identifying hyper-threading availability;

FIG. 8 illustrates sample code identifying the relationship between logical processors and physical processors;

FIG. 9 shows an exemplary MOF script used in connection with a preferred embodiment of the present invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The new series of processors with hyper-threading technology are capable of managing two threads of program execution simultaneously and, thus, appear to the host operating system as two "virtual" CPUs. The original CIM model and standard set of WMI providers did not account for this profound change in the computing environment and do not provide features to distinguish between the physical and virtual CPUs, and to retrieve the number of physical CPUs. Thus, there is a need to extend WMI by adding a hyper-threading processor object to the CIM schema and developing a corresponding provider.

To meet this need, the present invention provides a programmatic implementation of the custom WMI property provider, exposing status of hyper-threading capabilities and counts of physical and virtual CPUs to the CIMOM. Thus, the invention is capable of retrieving essential information—namely, hyper-threading status and number of logical and physical CPUs—and presenting it in a compatible format to the WMI Management Infrastructure. The present invention also provides a Management Object Format (MOF) script that extends the CIM schema with the hyper-threading information class and associates properties of this class (logical and physical CPU counts and status of the hyper-threading) with the corresponding custom provider. Thus, the invention defines a new management object in the CIM Object Repository and associates properties of the instances of this object with the hyper-threading property provider.

In accordance with the present invention, a digital computer system (referred to herein as WMI Hyper-Threading Property Provider (WMI-HTPP)) utilizes MOF, COM, and Win32 API, and custom assembly code, to discover and identify physical and logical CPUs present on the host system. A COM component adhering to the WMI interface specification exposes instance(s) of the WMI HTProcessor class. This provides, in a standardized and consistent way, details regarding processors in the system. A script in the Managed Object Format (MOF) language which, when compiled, introduces a new class, HTProcessor, into the WMI namespace and establishes a link between the class and corresponding property provider.

Figure 1:
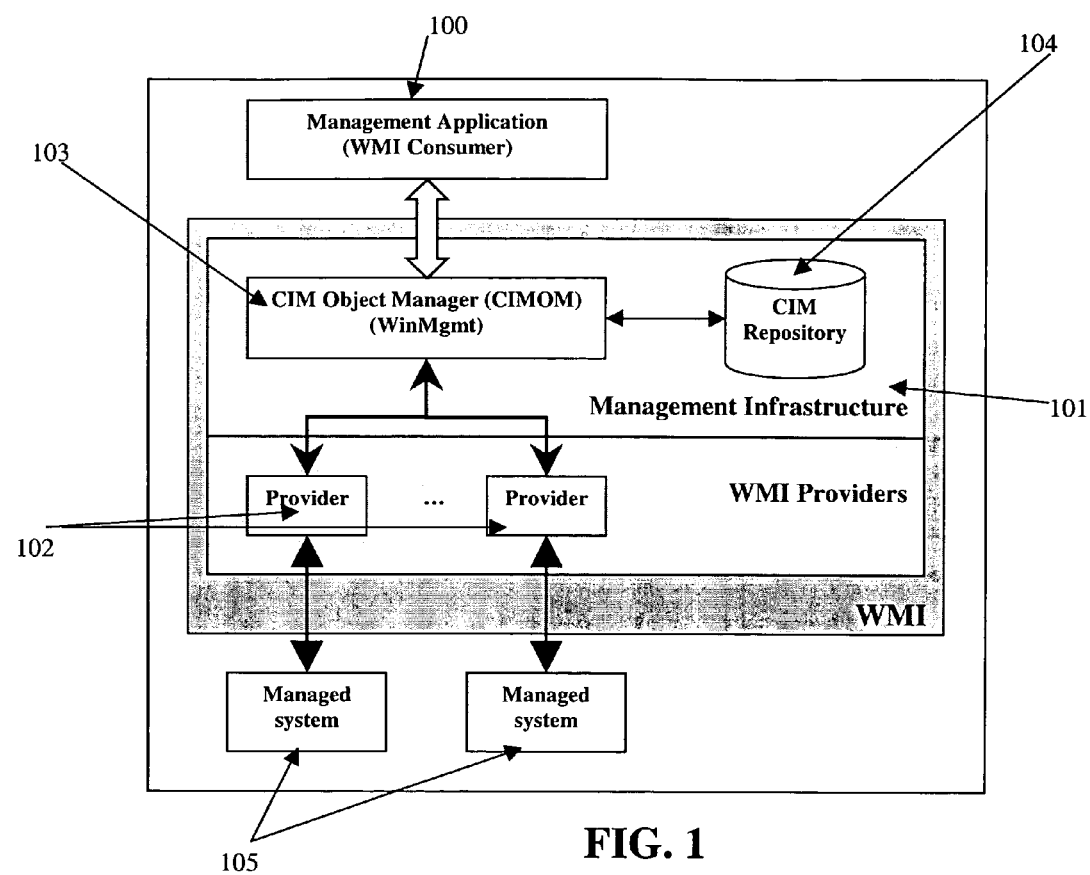
FIG. 1 illustrates an exemplary architecture used in connection with a preferred embodiment of the present invention.

With reference to FIG. 1, the WMI architecture is described. The WMI architecture includes the management infrastructure 101 and WMI providers 102 (such as WMI-HTPP). The management infrastructure 101 includes the CIM Object Manager (CIMOM) 103 and a central storage area for managing data, referred to as the CIMOM object repository 104. The CIMOM 103 provides applications with uniform access to management data. WMI providers 102 function as intermediaries between CIMOM 103 and managed objects 105. Managed object 105 can be a computer system, a hard drive, or a monitor, by way of example; generally, the managed object 105 is an item for which one of the providers 102 is responsible. Using the WMI APIs, defined as a set of WMI-specific COM interfaces, providers 102 supply CIMOM 103 with data from managed objects 105, handle requests on behalf of management applications 100, and generate event notifications.

Communication among the components of the WMI architecture is described as follows. When a request is made from management application 100 for information about, e.g., a class, CIMOM 103 retrieves information about the class from the CIM object repository 104 and the requested information is returned. Based on the information returned, CIMOM 103 determines whether it can obtain information about the class from CIM object repository 104 or whether it must query one of providers 102. If CIMOM 103 needs to query the provider 102, it obtains information about the provider 102 from the CIM object repository 104, namely, what type of provider 102, how should it communicate with the provider 102, and what properties does the provider support.

The WMI specification defines several types of providers that can plug into the management infrastructure 101, such as Class, Instance, and Property providers. Class providers define the corresponding WMI Management Object (Class) in the CIMOM object repository 104 and identify and populate instances of this class. Class providers are mostly self-contained, but, at the same time, are the most rigid providers—once implemented, changes to the corresponding class would require re-coding of the provider. Also, the properties of the instances of the corresponding class can not be used in other classes directly.

Instance providers define the instances of a pre-defined WMI Management Object and populate their properties with the values obtained or pertinent to the instances of the corresponding managed objects. If the object definition changes, the instance provider code must also be changed accordingly.

WMI property providers supply to the management infrastructure only the properties of a certain category of managed objects. These properties should be mapped to instances of some WMI Managed Objects outside and independently of the provider, generally through an MOF script. As long as the exposed properties stay the same, which is generally the case for any physical objects, there is no need to change the property provider—the Managed Object definition may change, and properties may be mapped to the instances of a different class, but the provider will be able to stay the same and provide useful functionality to the management infrastructure.

In accordance with these considerations, the WMI provider of the present invention is developed and coded as a property provider (i.e., WMI-HTPP), which requires the development of a corresponding MOF script that brings the WMI-HTPP into the WMI management framework.

Figure 2:
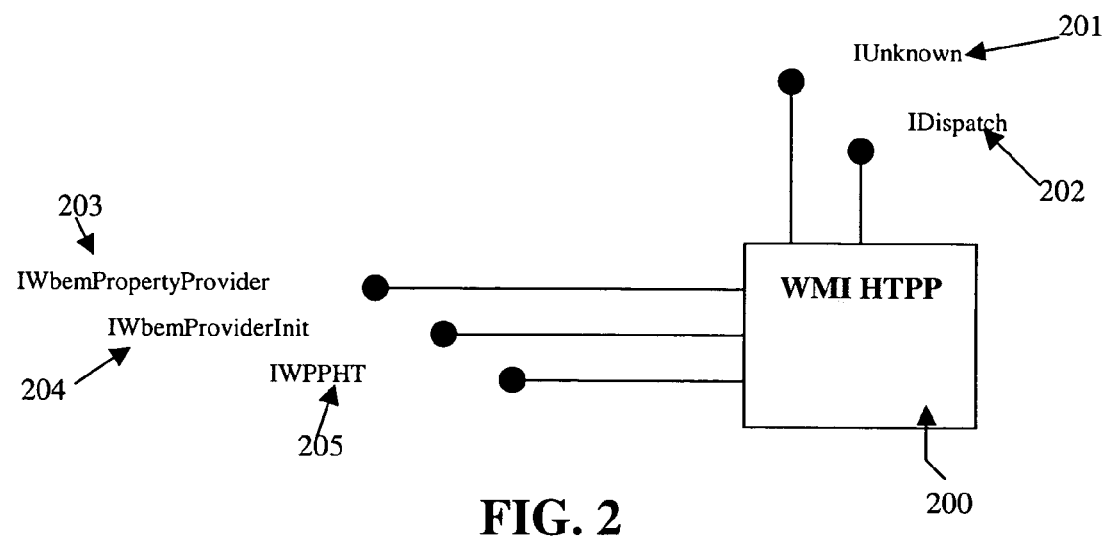
FIG. 2 illustrates a preferred embodiment of the provider object used in connection with a preferred embodiment of the present invention.

FIG. 2 illustrates a COM representation of the Hyper-Threading Property Provider object 200 (one of providers 102 shown in FIG. 1). This object 200 implements two standard COM interfaces (IUknown 201 and IDispatch 202); two interfaces required for WMI property provider interfaces (IWBEMPropertyProvider 203 and IWBEMProviderInit 204); and an empty IWPPHT interface 205. These interfaces are detailed in FIGS. 3, 4 and 5.

FIG. 3 illustrates a definition of the IWBEMPropertyProvider interface 203, of FIG. 2, in Microsoft Interface Definition Language (MIDL). This interface defines two methods—GetProperty and PutProperty. These methods are invoked by the management infrastructure 101, of FIG. 1, to implement read and write access to the properties exposed by the corresponding property provider (e.g., provider 102 of FIG. 1).

FIG. 4 illustrates an MIDL definition of the IWBEMProviderInit interface 204, of FIG. 2, which is invoked by the management infrastructure 101, of FIG. 1, when the provider 102 is activated to give the provider 102 a chance to initialize internal data structures and inform the management infrastructure 101 about the operation status of the provider 102.

FIG. 5 illustrates an MIDL definition of the IWPPHT interface 205, of FIG. 2. This interface does not have properties, methods, or events defined in it—it is essentially empty, and is used only to bring the IDispatch interface 202 definition (through inheritance) into the implementation of the monitor information COM object 200 of FIG. 2.

FIG. 6 illustrates an MIDL definition of the COM class, that instantiates the WMI-HTPP object. As can be seen in the definition, the WMI-HTPP object implements all three interfaces described in FIGS. 3, 4, and 5.

FIG. 7 illustrates a routine identifying whether the current CPU is capable of hyper-threading. FIG. 8 illustrates a routine capable of identifying the relationship between the logical (virtual) CPUs and underlying physical CPUs. For a non hyper-threading system, this number is equal to one (i.e., one logical (virtual) CPU per physical CPU). For a hyper-threading system, this value is equal to two (i.e., two logical (virtual) CPUs per physical CPU). It is conceivable that, in the future, this ratio may take higher values.

With reference to FIG. 9, to make a WMI provider available to CIMOM 103, the provider must be identified to CIMOM and associated with either some existing or a new Management Object class in the CIM Repository. Both of these functions are performed by the MOF compiler, which processes required directives represented in the MOF format. The MOF script represented in FIG. 9 defines the new HTProcessor class; introduces the new WMI-HTPP and associates it with the COM class (defined in FIG. 6); and associates properties exposed by this provider with the instances of the HTProcessor class. In the exemplary script shown in FIG. 9, only one instance of the HTProcessor class is defined, as this provides summary information for all processors (logical and physical) in the system.

A preferred implementation of the WMI-HTPP is described in detail, as follows. WMI providers are COM objects exposing WMI-specific interfaces. FIGS. 2, 3 and 4, detail the COM interfaces that WMI-HTPP implements to become a WMI Property Provider. To make WMI-HTPP accessible both from within the WMI management framework (as a WMI property provider), as well as directly using standard COM Automation containers (like Visual Basic, Excel, etc), the WMI-HTPP object implements the additional interface, detailed in FIG. 5, which is derived from the IDispatch COM interface. This makes WMI-HTPP compatible with the COM Automation containers.

When the WMI provider is loaded by the WMI management infrastructure 101, of FIG. 1, the infrastructure invokes the IWbemProviderInit::Initialize method (see FIG. 4) to give the provider an opportunity to initialize its internal data structures. The WMI-HTPP's implementation of the IWbemProviderInit::Initialize method identifies the hyper-threading status of the system and determines the number of logical (virtual) and physical CPUs. In doing so, the initialization routine invokes the routines detailed in FIGS. 7 and 8. This information is stored for subsequent use in the GetProperty invocations. Such an implementation improves provider performance while not jeopardizing consistency of the provided results, as the hyper-threading information could not change without rebooting the system, at which time all the providers will re-initialize.

After the initialization is completed, the provider is ready to serve the requests. The possible requests are the GetProperty and PutProperty method calls as defined by the IWBEMPropertyProvider interface (see FIG. 3). The IWBEMPropertyProvider::Get-Property method is invoked on the WMI-HTPP when the WMI management infrastructure 101, of FIG. 1, tries to obtain properties of the CPUs.

Among others, the framework supplies three important parameters to the IWBEMPropertyProvider::Get-Property method implementation, which are the Class Mapping, Instance Mapping, and Property Mapping. For the WMI-HTPP, the first parameter should be "HTProcessor". The second parameter, Instance Mapping, should be equal to one, which identifies the first and only instance of the HTProcessor class. The third parameter, Property Mapping, should be either "Status", to obtain the hyper-threading status of the system, or "LCPUCnt" or "PCPUCnt" for the number of logical or physical processors on the system, respectively. If the value of one of the Class or Instance or Property Mapping is invalid, the WMI-HTPP returns WMI error code.

As the properties exposed through WMI-HTPP are essentially read-only (i.e., their values reflect the status and characteristics of the system, which reflect hardware capabilities and cannot be changed programmatically), it does not make any sense to implement the IWBEMPropertyProvider::PutProperty; thus, the PutProperty, when invoked, returns the standard WMI error message "Not implemented".

The details of the WMI-HTPP Registration MOF script are described as follows. The MOF script provided in connection with the present invention, illustrated in FIG. 9, makes the WMI-HTPP available to the WMI management infrastructure 101, of FIG. 1; defines the HTProcessor CIM Managed Object; and associates attributes of this object with the properties exposed by the WMI-HTPP. To achieve these objectives, the script is compiled on the target computer system using the MS MOF compilation utility mofcomp.exe.

A detailed description of the MOF language can be found in Stemp, Greg, "WMI Helps Those Who Help Themselvest", Feb. 11, 2004. The following provides a description of the clauses of the script pertinent specifically to WMI-HTPP. The first clause:

```
instance of __Win32Provider as $WPPHT
{
    Enabled = TRUE;
    Name = "HTCUPInfo";
    ClsId = "{A677D067-9C48-4EF2-8DB3-BF2B43B434E9}";
};
``` brings into the fold of WMI management infrastructure a COM object, identified by the value of the ClsId property, as a new WMI-Compatible provider. The ClsId value in this clause should match the uuid value in the definition of the HTPP COM class (see FIG. 6). The second clause:

```
instance of __PropertyProviderRegistration
{
    Provider = $WPPHT;
    SupportsPut = FALSE;
    SupportsGet = TRUE;
};
``` defines this new provider as a Property Provider. The third clause:

```
#pragma deleteclass("HTProcessor", NOFAIL)
class HTProcessor
{
    [KEY]
    uint32      Index;
    STRING      Status;
    uint32      LogicalCpuCount;
    uint32      PhysicalCpuCount;
};
``` defines a new Management object, HTProcessor class, to store hyper-threading status and counts of logical and physical CPUs on the system. The last clause

```
[DYNPROPS,ClassContext("HTProcessor"),InstanceContext("1")]
instance of HTProcessor
    {
    Index = 1;
    [PropertyContext("Status"), DYNAMIC, Provider
    ("HTCPUInfo")]
Status;
    [PropertyContext("LCPUCnt"), DYNAMIC, Provider
("HTCPUInfo")] LogicalCpuCount;
    [PropertyContext("PCPUCnt"), DYNAMIC, Provider
("HTCPUInfo")] PhysicalCpuCount;
    };
``` define an instance of the HTProcessor class and associate class attributes of this class with the properties exposed by the WMI-HTPP. The ClassContext, InstanceContext, and PropertyContext attributes provide values mapped by the infrastructure into the values of ClassMapping, InstanceMapping, and PropertyMapping parameters of the GetProperty call to HT-PP provider.

Figure 10:
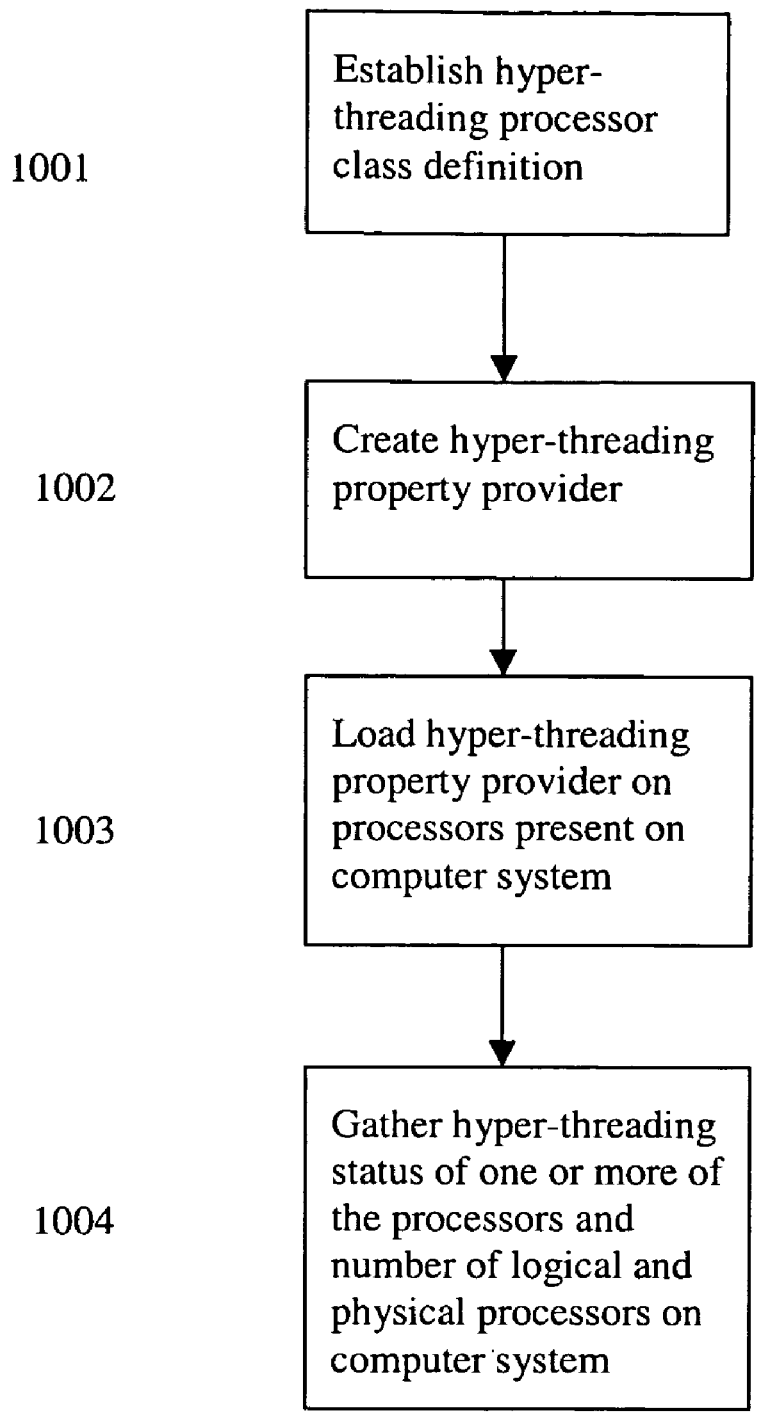
FIG. 10 is a flow chart illustrating a method of the present invention.

FIG. 10 is a flow chart illustrating a preferred embodiment of a method for collecting information regarding processors present on computer systems. In step 1001, a hyper-threading processor class definition is established. In step 1002, a hyper-threading property provider is created. In step 1003, the hyper-threading property provider is loaded on one or more processors present on a computer system. In step 1004, the hyper-threading property provider gathers a hyper-threading status of one or more of the processors and a number of logical and physical processors on the computer system.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

I claim:

1. A method comprising:
    (A) establishing a hyper-threading processor class definition to define one or more processors present on a computer system, the hyper-threading processor class definition having a set of properties for the one or more processors;
    (B) creating a hyper-threading property provider to gather information about the one or more processors,
    (C) associating the hyper-threading property provider with the hyper-threading processor class definition;
    (D) loading the hyper-threading property provider on the one or more processors; and
    (E) gathering, by the hyper-threading property provider, the set of properties of the one or more processors comprising a hyper-threading status of the one or more of the processors and a number of logical and physical processors on the computer system.

2. The method of claim 1, wherein the hyper-threading property provider is made available to a management infrastructure in accordance with a registration script.

3. The method of claim 1, wherein a registration script defines a hyper-threading processor management object and associates one or more properties of one or more instances of the hyper-threading processor management object with the hyper-threading property provider.

4. A system for collecting information regarding processors present on computer systems, comprising:
    one or more processors present on a computer system;
    a hyper-threading processor class definition to define the one or more processors present on the computer system, the hyper-threading processor class definition having a set of properties for the one or more processors; and
    a hyper-threading property provider associated with the hyper-threading processor class definition, the hyper-threading property provider loaded on the one or more of the processors to gather a hyper-threading status of one or more of the processors and a number of logical and physical processors on the computer system.

5. The system of claim 4 further comprising a management infrastructure, wherein the hyper-threading provider is made available to the management infrastructure in accordance with a registration script.

6. The system of claim 4, wherein a registration script defines a hyper-threading processor management object and associates one or more properties of one or more instances of the hyper-threading processor management object with the hyper-threading property provider.

7. A computer program product including a computer readable medium having stored thereon computer executable instructions that, when executed on a computer, configure the computer to perform a method comprising the steps of:
    establishing a hyper-threading processor class definition to define one or more processors present on a computer system, the hyper-threading processor class definition having a set of properties for the one or more processors;
    creating a hyper-threading property provider to gather information about the one or more processors;
    associating the hyper-threading property provider with the hyper-threading processor class definition;
    loading the hyper-threading property provider on the one or more processors; and
    gathering, by the hyper-threading property provider, the set of properties of the one or more processors comprising a hyper-threading status of the one or more of the processors and a number of logical and physical processors on the computer system.

8. The computer program product of claim 7, wherein the hyper-threading property provider is made available to a management infrastructure in accordance with a registration script.

9. The computer program product of claim 7, wherein a registration script defines a hyper-threading processor management object and associates one or more properties of one or more instances of the hyper-threading processor management object with the hyper-threading property provider.

* * * * *